United States Patent
Byun et al.

(10) Patent No.: US 12,541,117 B2
(45) Date of Patent: Feb. 3, 2026

(54) THREE-DIMENSIONAL CONVERSION MEMBER AND STEREOSCOPIC IMAGE DISPLAY DEVICE INCLUDING THE SAME

(71) Applicant: LG Display Co., Ltd., Seoul (KR)

(72) Inventors: Se Yeop Byun, Paju-si (KR); Wan Hee Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 373 days.

(21) Appl. No.: 18/326,928

(22) Filed: May 31, 2023

(65) Prior Publication Data

US 2024/0219744 A1  Jul. 4, 2024

(30) Foreign Application Priority Data

Dec. 29, 2022  (KR) ........................ 10-2022-0189832

(51) Int. Cl.
*G02B 27/01*  (2006.01)
*G02B 30/27*  (2020.01)
*G02B 30/29*  (2020.01)

(52) U.S. Cl.
CPC ............ *G02B 30/29* (2020.01); *G02B 30/27* (2020.01)

(58) Field of Classification Search
CPC ..... G02B 27/0172; G02B 30/27; G02B 30/29
USPC .......................................................... 359/463
See application file for complete search history.

(56) References Cited

U.S. PATENT DOCUMENTS 11,774,642 B2 * 10/2023 Kim .................... G02F 1/17
                                                    359/463
2016/0140881 A1 * 5/2016 Spiro .................. G09F 3/10
                                                    156/212

\* cited by examiner

*Primary Examiner* — Audrey Y Chang
(74) *Attorney, Agent, or Firm* — Seed Intellectual Property Law Group LLP

(57) ABSTRACT

Disclosed is a display device including a display panel and a three-dimensional conversion member located on a display surface of the display panel. The three-dimensional conversion member includes a base unit including at least two base layers and a lens unit located on an upper surface of the base unit. The base unit includes a soft layer forming neutral planes in the at least two base layers.

8 Claims, 6 Drawing Sheets

THREE-DIMENSIONAL CONVERSION MEMBER AND STEREOSCOPIC IMAGE DISPLAY DEVICE INCLUDING THE SAME

CROSS-REFERENCE TO RELATED APPLICATION

This application claims the benefit of Korean Patent Application No. 10-2022-0189832, filed on Dec. 29, 2022, which is hereby incorporated by reference as if fully set forth herein.

BACKGROUND

Technical Field

The present disclosure relates to a stereoscopic image display device.

Description of the Related Art

With the development of information technology, the market for display devices, which act as an intermediary between users and information, is growing. Thus, use of display devices such as light-emitting displays (LEDs), quantum dot displays (QDDs), and liquid crystal displays (LCDs) is increasing.

A display device may display images in such a manner that drive signals, for example, scan signals and data signals, are supplied to sub-pixels formed on a display panel so that selected sub-pixels transmit light or directly emit light. Such a display device may be implemented as a stereoscopic image display device capable of providing three-dimensional images to a user.

Stereoscopic image display devices may be classified into glasses-type stereoscopic image display devices, which include glasses, and autostereoscopic image display devices, which may not use glasses. Research on a structure capable of coping with changes in shape of display panels in a stereoscopic image display device field as well as a general display device field is underway.

BRIEF SUMMARY

The present disclosure is directed to a three-dimensional conversion member and a stereoscopic image display device including the same that, among others, substantially obviate one or more problems due to limitations and disadvantages of the related art.

Embodiments of the present disclosure provide a three-dimensional conversion member and a stereoscopic image display device including the same, which is capable of minimizing tensile stress generated in the three-dimensional conversion member at the time of change in shape thereof, thereby minimizing or preventing cracking of a surface of the three-dimensional conversion member.

A display device according to an embodiment of the present disclosure includes a display panel and a three-dimensional conversion member located on a display surface of the display panel, wherein the three-dimensional conversion member includes a base unit including at least two base layers and a lens unit located on an upper surface of the base unit, and wherein the base unit includes a soft layer forming neutral planes in the at least two base layers.

The base unit may include a first base layer having a first thickness, and the soft layer may be located on the first base layer and may have a second thickness. The base unit may include a second base layer located on the soft layer and having a third thickness. A sum of the first thickness, the second thickness, and the third thickness may be constant.

The first thickness and the third thickness may be equal to each other.

The soft layer may be located between the at least two base layers.

The lens unit may include a lenticular lens.

A three-dimensional conversion member according to an embodiment of the present disclosure includes a base unit including at least two base layers and a lens unit located on an upper surface of the base unit, wherein the base unit includes a soft layer forming neutral planes in the at least two base layers.

The soft layer may be located between the at least two base layers.

The base unit may include a first base layer, and the soft layer may be located on the first base layer. The base unit may include a second base layer located on the soft layer. The thickness of the first base layer and the thickness of the second base layer may be equal to each other.

The base unit may be configured to satisfy the following condition: $B1+B2=$ total thickness T of base unit–thickness A of soft layer, where B1 represents the thickness of the first base layer, and B2 represents the thickness of the second base layer.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
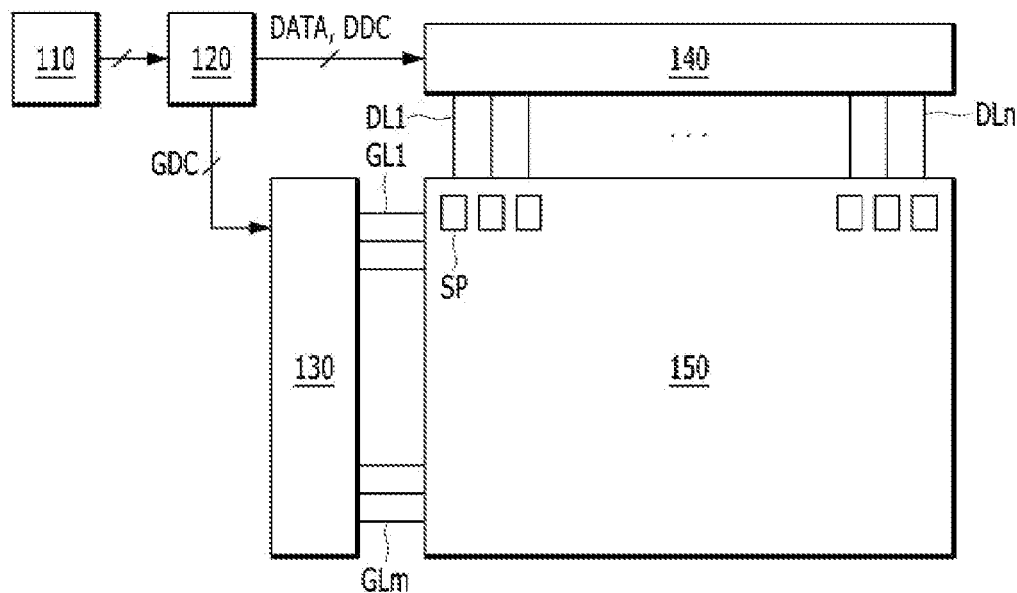
FIG. 1 is a block diagram schematically showing the configuration of a display device.

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art.

In the drawings for explaining the example embodiments of the present disclosure, for example, the illustrated shape, size, ratio, angle, and number are given by way of example, and thus, are not limited to the disclosure. Throughout the present specification, the same reference numerals designate the same constituent elements. The terms "comprises," "includes," and/or "has," used in this specification, do not preclude the presence or addition of other elements unless used along with the term "only." The singular forms are intended to include the plural forms as well, unless the context clearly indicates otherwise.

In the interpretation of constituent elements, the constituent elements are interpreted as including an error range even if there is no explicit description thereof.

In the description of the various embodiments, when describing positional relationships, for example, when the positional relationship between two parts is described using "on," "above," "below," "next to," or the like, one or more other parts may be located between the two parts unless the term "directly" or "closely" is used.

It may be understood that, although the terms "first," "second," etc., may be used herein to describe various elements, these elements are not to be limited by these terms. These terms are merely used to distinguish one element from another. Therefore, in the present specification, an element indicated by "first" may be the same as an element indicated by "second" without exceeding the technical scope of the present disclosure, unless otherwise mentioned.

A display device according to the present disclosure may be implemented in televisions, video players, personal computers (PCs), home theater systems, automotive electrical devices, smartphones, and so on, without being limited thereto. The display device according to the present disclosure may be implemented as a light-emitting display device, a quantum dot display device, or a liquid crystal display device. For convenience of description, a display device that directly emits light based on an inorganic light-emitting diode or an organic light-emitting diode is taken as an example of the display device according to the present disclosure.

The same reference numerals used throughout the specification refer to substantially the same constituent elements. Hereinafter, embodiments of the present disclosure will be described in detail with reference to the accompanying drawings. In the following description of the present disclosure, a detailed description of known functions or configurations incorporated herein will be omitted when it may make the subject matter of the present disclosure rather unclear.

Figure 2:
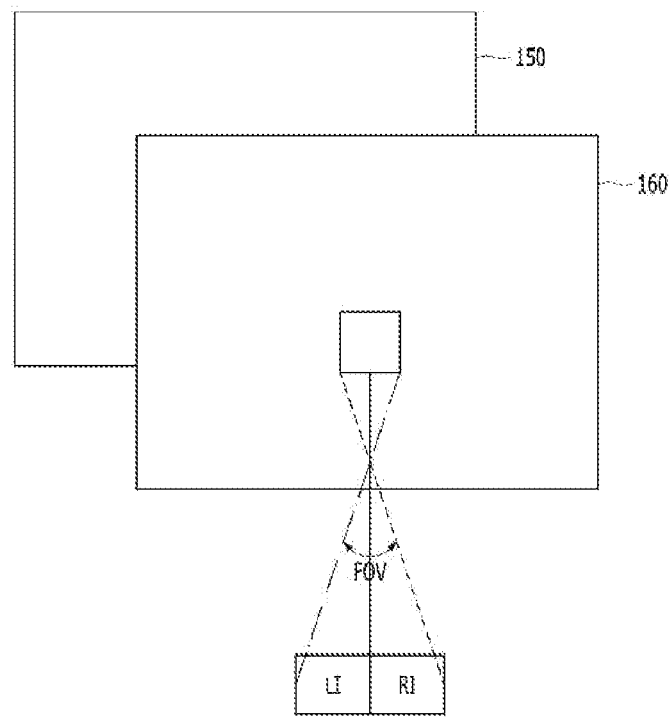
FIG. 2 is a diagram schematically showing a part of an autostereoscopic image display device provided based on the display device shown in FIG. 1.

FIG. 1 is a block diagram schematically showing the configuration of a display device, and FIG. 2 is a diagram schematically showing a part of an autostereoscopic image display device provided based on the display device shown in FIG. 1.

As shown in FIG. 1, the display device may include an image supply 110, a timing controller 120, a gate driver 130, a data driver 140, and a display panel 150.

The image supply 110 may output various drive signals together with an image data signal supplied from the outside or an image data signal stored in an internal memory. The image supply 110 may supply data signals and various drive signals to the timing controller 120.

The timing controller 120 may output a gate timing control signal GDC for controlling an operation timing of the gate driver 130, a data timing control signal DDC for controlling an operation timing of the data driver 140, and various synchronization signals. The timing controller 120 may supply the data driver 140 with data signals DATA supplied from the image supply 110, together with the data timing control signal DDC. The timing controller 120 may be configured in the form of an integrated circuit (IC) and mounted on a printed circuit board, but the disclosure is not limited thereto.

The data driver 140 may sample and latch the data signals DATA in response to the data timing control signal DDC supplied from the timing controller 120, may convert digital data signals into analog data voltages on the basis of a gamma reference voltage, and may output the analog data voltages. The data driver 140 may supply the data voltages to sub-pixels included in the display panel 150 through data lines DL1 to DLn. The data driver 140 may be configured in the form of an IC and mounted on the display panel 150 or mounted on the printed circuit board, but the disclosure is not limited thereto.

The gate driver 130 may supply at least one scan signal to sub-pixels included in the display panel 150 through gate lines GL1 to GLm. The gate driver 130 may be configured in the form of an IC, or may be directly formed on the display panel 150 in a gate-in-panel (GIP) structure. The gate driver 130 formed in a GIP structure may be disposed on one edge of the display panel 150, or may be dividedly disposed on both edges of the display panel 150.

The display panel 150 may be configured such that the gate lines GL and the data lines DL are arranged in a matrix, and may include a plurality of sub-pixels SP arranged at intersections of the gate lines GL and data lines DL. The sub-pixels SP may control light generated by themselves or light provided from the outside on the basis of scan signals input through the gate lines GL and data voltages input through the data lines DL.

As shown in FIG. 2, the display device in FIG. 1 may include a three-dimensional (3D) conversion member 160 disposed on a display surface of the display panel 150. The 3D conversion member 160 may divide (separate) a two-dimensional image displayed on the display surface of the display panel 150 into a left-eye image L1 and a right-eye image RI.

The 3D conversion member 160 may include a structure capable of converting an image so that a viewer can view a 3D image without wearing glasses. A stereoscopic image display device configured to enable a viewer to view a 3D image without wearing glasses is referred to as an autostereoscopic image display device.

In the case of an autostereoscopic image display device, some implementations of the disclosure optimize a field-of-view (FOV) condition, which means a 3D viewing limit area, in order to minimize visually induced motion sickness (3D motion sickness), crosstalk, visual fatigue, and the like when a viewer views 3D images.

Figure 3:
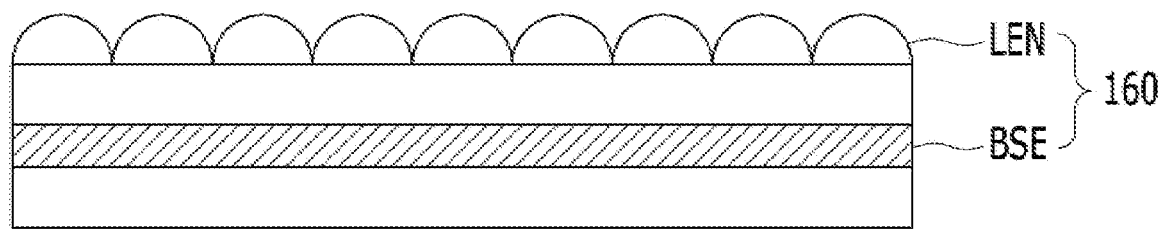
FIG. 3 is a cross-sectional view of a three-dimensional conversion member.
Figure 4:
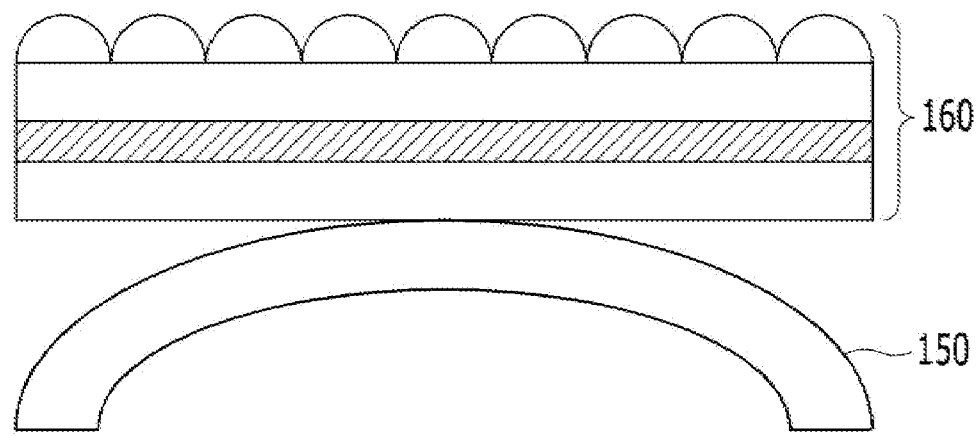
FIGS. 4 to 6 are views showing an autostereoscopic image display device having a curved-type display panel to which the three-dimensional conversion member in FIG. 3 is attached.
Figure 5:
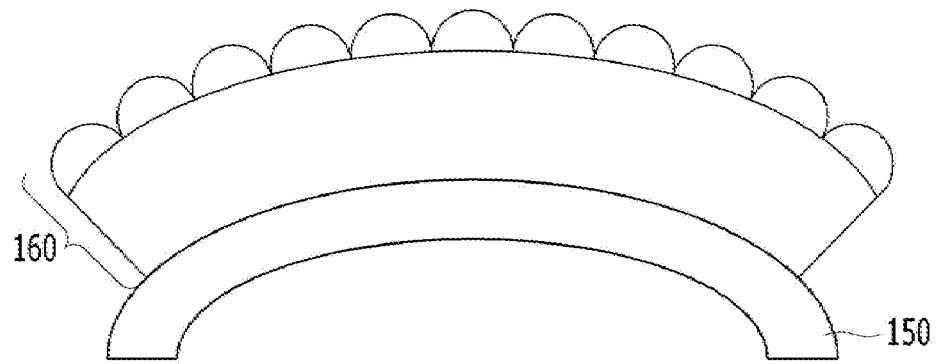
Figure 6:
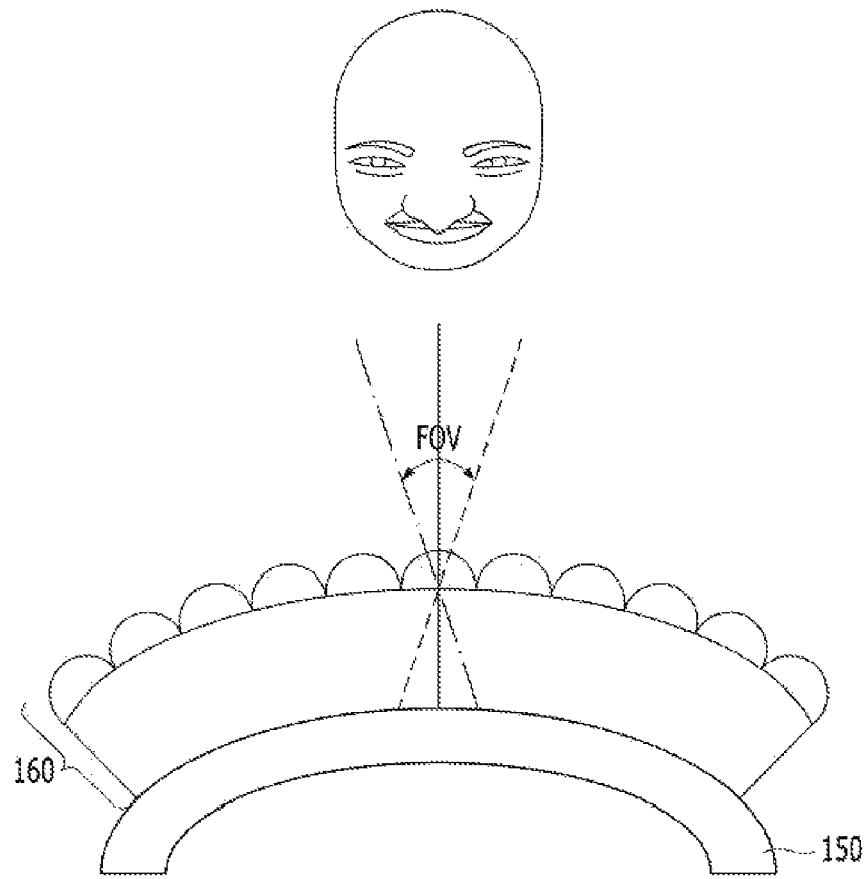

FIG. 3 is a cross-sectional view of the 3D conversion member, and FIGS. 4 to 6 are views showing an autostereoscopic image display device having a curved-type display panel to which the 3D conversion member in FIG. 3 is attached.

As shown in FIG. 3, the 3D conversion member 160 may include a base unit BSE and a lens unit LEN. The base unit BSE and the lens unit LEN may be made of a highly transparent (highly transmissive) material capable of transmitting an image (light). The base unit BSE may be defined as a layer located on the display panel to support the lens unit LEN.

The lens unit LEN may be a layer located on the upper surface of the base unit BSE to divide a two-dimensional image into a left-eye image and a right-eye image. In an example, the lens unit LEN is implemented as a lenticular lens capable of dividing a two-dimensional image into a left-eye image and a right-eye image. However, the type of lens unit LEN according to the embodiment is not limited thereto.

As shown in FIGS. 4 to 6, the display panel 150 may be implemented in a curved type (convex type) in which a portion of the display panel 150 is curved, specifically a central area of the display surface protrudes convexly relative to left and right areas of the display surface.

The 3D conversion member 160 may be disposed on the display surface of the curved-type display panel 150, and may be attached thereto along the curved surface thereof. The curved-type display panel 150 may be fixed in a curved state, or may be changed in shape from a curved state to a flat state (or from a flat state to a curved state) by a physical or mechanical structure.

An autostereoscopic image display device having the curved-type display panel 150 to which the 3D conversion member 160 is attached enables a viewer to view 3D images without wearing glasses. When the 3D conversion member 160 has a curved shape corresponding to the curved-type display panel 150 (when the shape of the 3D conversion member 160 is changed), the optimized FOV condition may be different from when the 3D conversion member 160 is attached to a flat-type display panel. However, the optimized FOV condition may be set through experimentation. When the 3D conversion member 160 has a curved shape corresponding to the curved-type display panel 150, stress may be generated due to change in the shape thereof, whereby the surface thereof may crack. A structure capable of preventing this problem will be described below.

Figure 7:
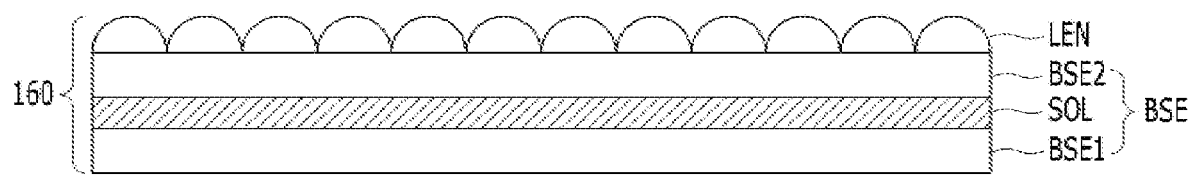
FIG. 7 is a cross-sectional view of a three-dimensional conversion member according to a first embodiment.
Figure 8:
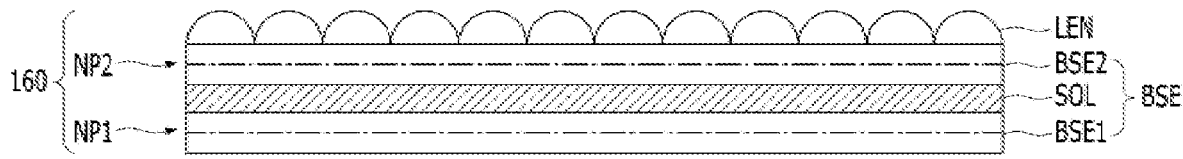
FIG. 8 is a cross-sectional view showing neutral planes of the three-dimensional conversion member according to the first embodiment.
Figure 9:
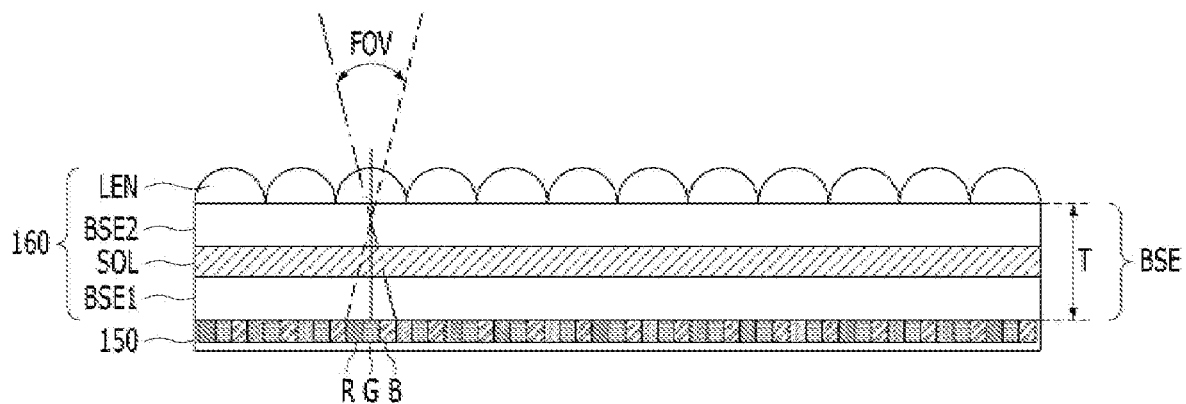
FIG. 9 is a cross-sectional view for explaining the total thickness of a base unit included in the three-dimensional conversion member according to the first embodiment.
Figure 10:
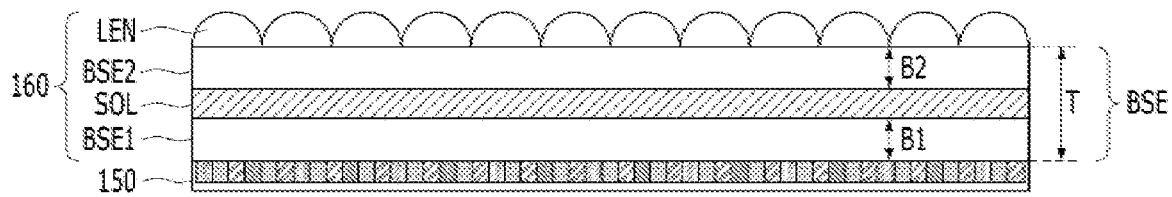
FIG. 10 is a cross-sectional view for explaining the thickness relationship between a first base layer and a second base layer, with a soft layer excluded from the total thickness of the base unit shown in FIG. 9.

FIG. 7 is a cross-sectional view of a 3D conversion member according to a first embodiment, FIG. 8 is a cross-sectional view showing neutral planes of the 3D conversion member according to the first embodiment, FIG. 9 is a cross-sectional view for explaining the total thickness of a base unit included in the 3D conversion member according to the first embodiment, and FIG. 10 is a cross-sectional view for explaining the thickness relationship between a first base layer and a second base layer, with a soft layer excluded from the total thickness of the base unit shown in FIG. 9.

As shown in FIG. 7, the 3D conversion member 160 according to the first embodiment may include a base unit BSE and a lens unit LEN. The base unit BSE may include a first base layer BSE1, a soft layer SOL, and a second base layer BSE2.

The first base layer BSE1 may be a lower base layer attached to the display panel, and the second base layer BSE2 may be an upper base layer supporting the lens unit LEN. The soft layer SOL may be a compensation layer located between the first base layer BSE1 and the second base layer BSE2.

The first base layer BSE1 and the second base layer BSE2 may be made of the same highly transparent (highly transmissive) material. The soft layer SOL may be made of a highly transparent (highly transmissive) material that is more flexible than that of the first base layer BSE1 and the second base layer BSE2.

The soft layer SOL may be made of an adhesive material having a low modulus of elasticity and having a refractive index similar or equal to those of the base unit BSE and the lens unit LEN, which constitute the 3D conversion member 160. For example, the soft layer SOL may be made of a silicon-based material.

As shown in FIG. 8, the soft layer SOL may form a plurality of neutral planes NP1 and NP2 in the first base layer BSE1 and the second base layer BSE2 in order to cancel tensile stress caused by change in the shape of the 3D conversion member 160.

When the soft layer SOL is located between the first base layer BSE1 and the second base layer BSE2, the first neutral plane NP1 may be formed in the first base layer BSE1, and the second neutral plane NP2 may be formed in the second base layer BSE2. When the 3D conversion member 160 is configured such that the soft layer SOL is included therein, the distances between the neutral planes NP1 and NP2 and the surface of the base unit BSE may be minimized.

As shown in FIG. 9, the 3D conversion member 160 including the soft layer SOL may be disposed on the display panel 150. It is preferable that the total thickness T of the 3D conversion member 160 when the soft layer SOL is included therein be set to be equal to that when the soft layer SOL is not included therein. The reason for this is that it is preferable that the optimized FOV condition not change even if the soft layer SOL is included in the 3D conversion member 160.

As shown in FIG. 10, it is preferable that the total thickness T of the 3D conversion member 160 when the soft layer SOL is included therein be set to be equal to that when the soft layer SOL is not included therein and that a first thickness B1 of the first base layer BSE1 and a second thickness B2 of the second base layer BSE2 be set to be equal to each other (B1=B2). That is, even if the first thickness B1 of the first base layer BSE1, the second thickness B2 of the second base layer BSE2, and the thickness of the soft layer SOL are set to be different from each other, the total thickness T thereof is maintained constant at all times. Therefore, it is preferable that the base unit BSE be configured to satisfy the following condition: B1+B2=total thickness T−thickness A of soft layer SOL.

Meanwhile, FIGS. 9 and 10 illustrate a flat-type display panel 150 including pixels composed of red, green, and blue sub-pixels RGB for convenience of description of the thickness relationships between the layers included in the 3D conversion member 160. In FIGS. 9 and 10, "T" representing the total thickness may be a distance between the lower surface of the lens unit LEN and the upper surface of the display panel 150 (or a distance between the lens unit and the pixels), and may be calculated based on the three-dimensional implementation characteristics, such as the number of pixels and the FOV.

Figure 11:
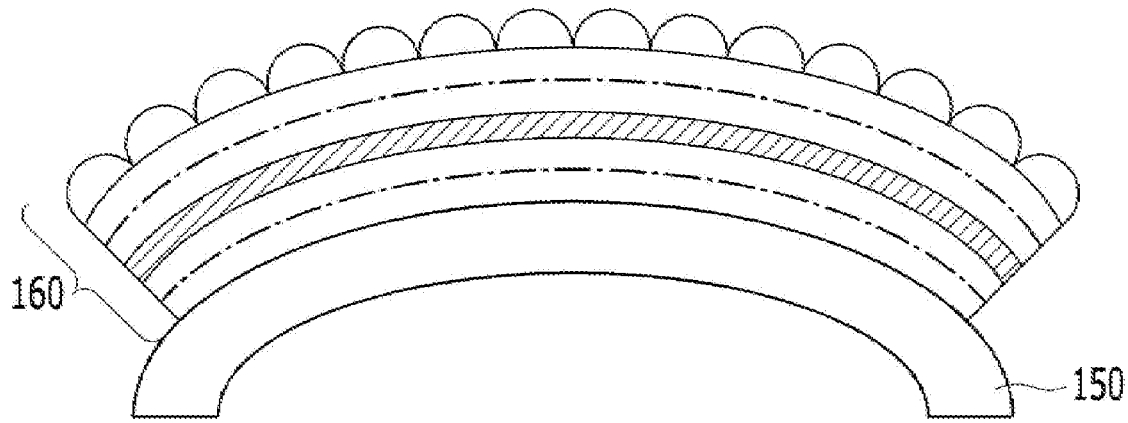
FIGS. 11 and 12 are drawings for explaining the advantage of the autostereoscopic image display device including the three-dimensional conversion member according to the first embodiment.
Figure 12:
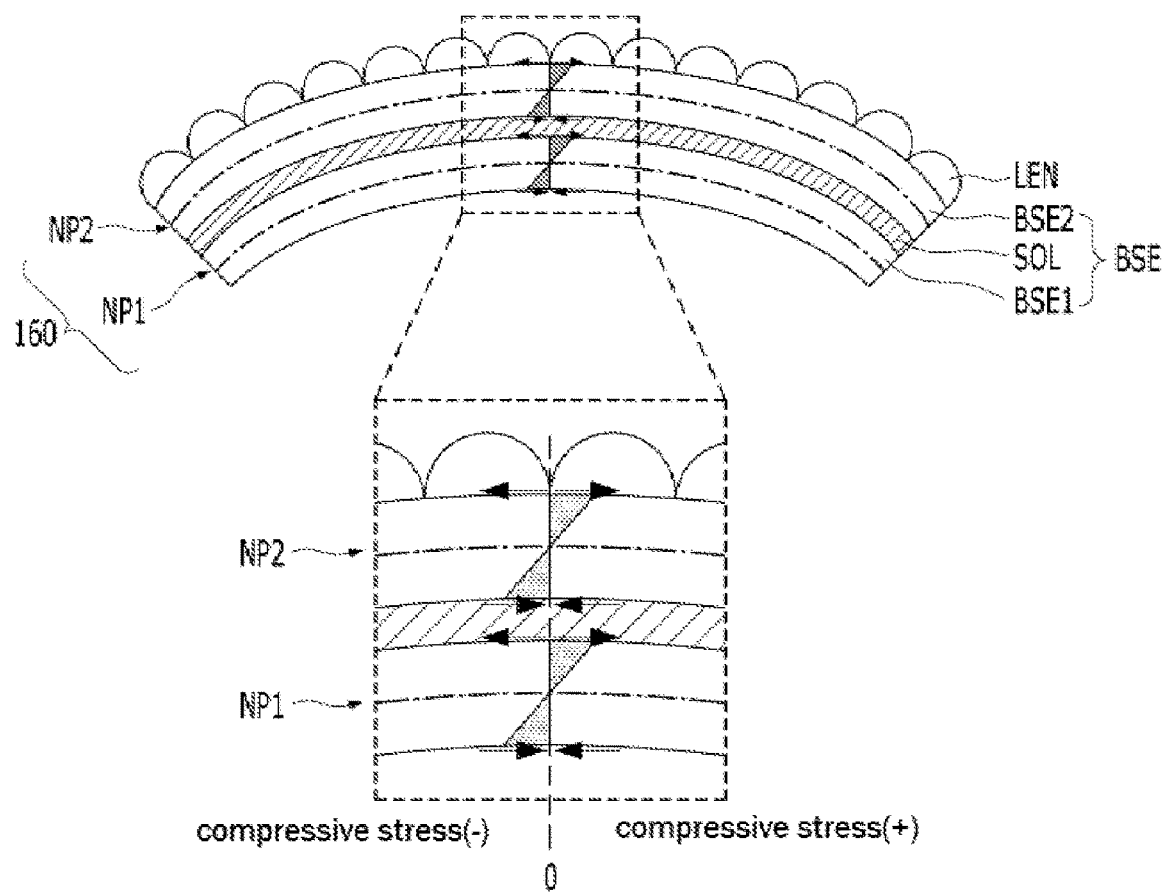

FIGS. 11 and 12 are drawings for explaining the advantage of the autostereoscopic image display device including the 3D conversion member according to the first embodiment.

As shown in FIG. 11, the display panel 150 may be implemented in a curved type in which a central area of the display surface protrudes convexly relative to left and right areas of the display surface. The 3D conversion member 160 according to the first embodiment may be disposed on the display surface of the curved-type display panel 150, and may be attached thereto along the curved surface thereof.

As shown in FIG. 12, since the soft layer SOL is included in the 3D conversion member 160 according to the first embodiment, a plurality of neutral planes NP1 and NP2 may be formed in the first base layer BSE1 and the second base layer BSE2. The plurality of neutral planes NP1 and NP2 may be planes in which first compressive stress (−) and second compressive stress (+) caused when the shape of the 3D conversion member 160 is changed are canceled out and therefore compressive stress substantially applied to the 3D conversion member 160 converges on zero (0).

Although FIG. 12 illustrates a case in which compressive stress generated inside the base unit BSE converges on zero (0) due to the plurality of neutral planes NP1 and NP2, tensile stress generated outside the base unit BSE may also converge on zero (0) due to the plurality of neutral planes NP1 and NP2, like the compressive stress.

Therefore, the autostereoscopic image display device including the 3D conversion member 160 according to the first embodiment is capable of canceling tensile stress and compressive stress caused when the shape of the display panel is changed, thereby preventing cracking of the surface of the 3D conversion member.

Figure 13:
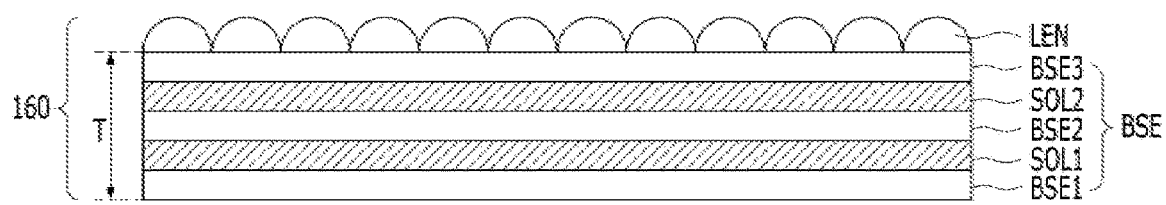
FIG. 13 is a cross-sectional view of a three-dimensional conversion member according to a second embodiment.

FIG. 13 is a cross-sectional view of a 3D conversion member according to a second embodiment.

As shown in FIG. 13, the 3D conversion member 160 according to the second embodiment may include at least two soft layers SOL1 and SOL2. According to the second embodiment, the base unit BSE may include a first base layer BSE1, a first soft layer SOL1, a second base layer BSE2, a second soft layer SOL2, and a third base layer BSE3.

According to the second embodiment, the total thickness T of the 3D conversion member 160 when the two soft layers SOL1 and SOL2 are included therein may be set to be equal to that when one soft layer is not included therein. All of the first to third base layers BSE1 to BSE3 may have the same thickness.

Figure 14:
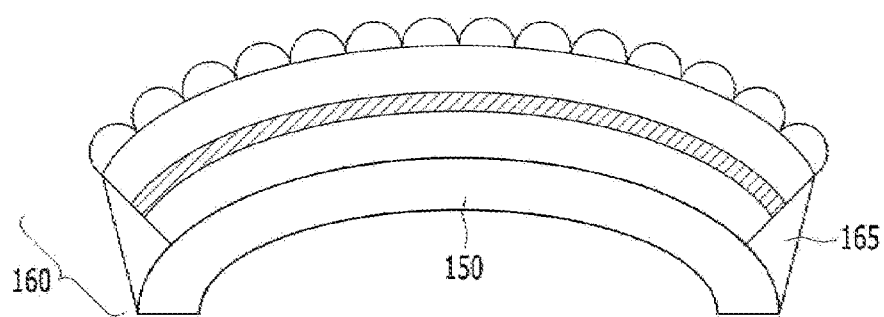
FIGS. 14 to 16 are views for explaining an autostereoscopic image display device including a three-dimensional conversion member according to a third embodiment.
Figure 15:
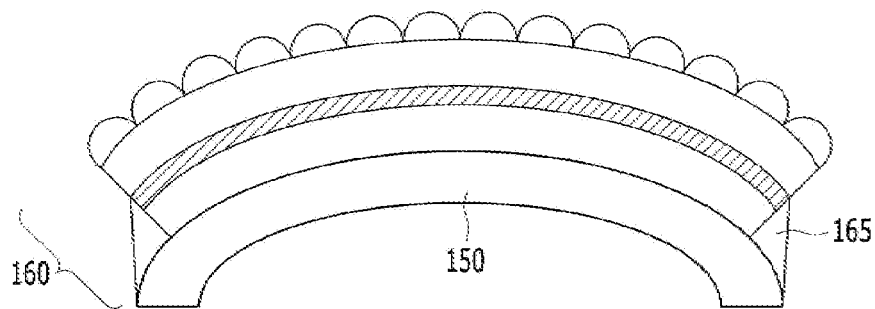
Figure 16:
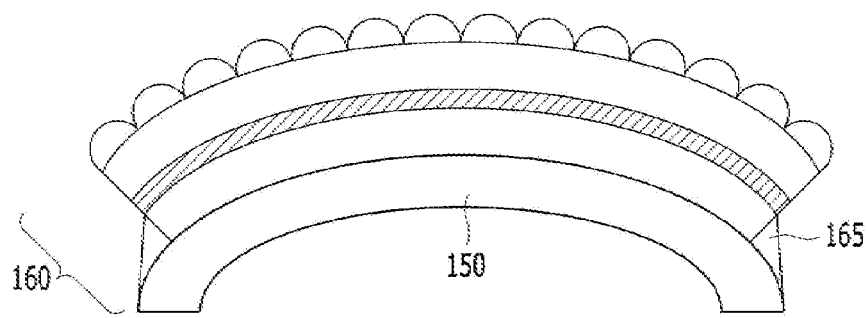

FIGS. 14 to 16 are views for explaining an autostereoscopic image display device including a 3D conversion member according to a third embodiment.

As shown in FIGS. 14 to 16, the autostereoscopic image display device according to the third embodiment may include the 3D conversion member 160 described in the first embodiment or the second embodiment. The 3D conversion member 160 described in the first embodiment or the second embodiment may cancel tensile stress and compressive stress caused when the shape of the display panel is changed. In some implementation, it is considered that a separation (lifting) problem may occur at the edge bonding surface between the display panel 150 and the 3D conversion member 160.

The autostereoscopic image display device including the 3D conversion member 160 according to the third embodiment may include an adhesive edge closure member 165 formed on an edge between the display panel 150 and the 3D conversion member 160 in consideration of a separation problem of the bonding surface.

As shown in FIG. 14, the edge closure member 165 may be formed so as to cover the edge of the display panel 150 and the entire area of a side surface of the 3D conversion member 160. For example, the edge closure member 165 may be formed so as to cover the entire area of the side surface of the base unit BSE shown in FIG. 7.

As shown in FIG. 15, the edge closure member 165 may be formed so as to cover the edge of the display panel 150 and half the entire area of the side surface of the 3D conversion member 160. For example, the edge closure member 165 may be formed so as to cover the side surface of the first base layer BSE1 of the base unit BSE and the side surface of the soft layer SOL shown in FIG. 7.

As shown in FIG. 16, the edge closure member 165 may be formed so as to cover the edge of the display panel 150 and a minimum required area of the side surface of the 3D conversion member 160. For example, the edge closure member 165 may be formed so as to cover only the side surface of the first base layer BSE1 of the base unit BSE shown in FIG. 7.

The edge closure member 165 is a countermeasure to a separation problem that may occur at the edge bonding surface due to stress caused when the shape of the display panel 150 is changed. The shape of the edge closure member 165 may vary in various manners and in various shapes so as to correspond to the configuration of a structure receiving the display panel 150.

Figure 17:
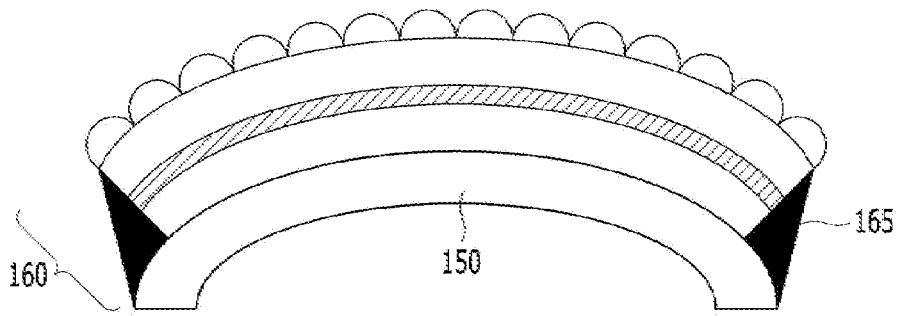
FIG. 17 is a view for explaining an autostereoscopic image display device including a three-dimensional conversion member according to a fourth embodiment.

FIG. 17 is a view for explaining an autostereoscopic image display device including a 3D conversion member according to a fourth embodiment.

As shown in FIG. 17, the autostereoscopic image display device according to the fourth embodiment may include the 3D conversion member 160 described in the first embodiment or the second embodiment. The 3D conversion member 160 described in the first embodiment or the second embodiment may cancel tensile stress and compressive stress caused when the shape of the display panel is changed.

In addition, the adhesive edge closure member 165 may be provided in order to prevent a separation problem that may occur at the edge bonding surface between the display panel 150 and the 3D conversion member 160. In addition, the adhesive edge closure member 165 may be made of a black material (containing a black pigment) in order to prevent light leakage that may occur at the outer side surface between the display panel 150 and the 3D conversion member 160.

As described above, the embodiment of the present disclosure may provide a 3D conversion member capable of minimizing tensile stress generated at the time of change in shape thereof while ensuring a specific thickness through a multilayer configuration. In addition, the embodiment of the present disclosure may minimize or prevent cracking of a surface of a 3D conversion member when an autostereoscopic image display device configured to be changeable in shape is implemented.

As is apparent from the above description, the embodiment has the following effects.

According to the three-dimensional conversion member and the stereoscopic image display device including the same of the present disclosure, it is possible to minimize tensile stress generated in the three-dimensional conversion member at the time of change in shape thereof while ensuring a specific thickness through a multilayer configuration.

According to the three-dimensional conversion member and the stereoscopic image display device including the same of the present disclosure, it is possible to minimize or prevent cracking of a surface of the three-dimensional conversion member when an autostereoscopic image display device configured to be changeable in shape is implemented.

According to the three-dimensional conversion member and the stereoscopic image display device including the same of the present disclosure, it is possible to improve optical performance without increase in power consumption and thus to obtain an image quality improvement effect. As a result, it is possible to realize a low-power display capable of providing high-quality images with reduced power consumption.

It will be apparent to those skilled in the art that various modifications and variations can be made without departing from the spirit or scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A stereoscopic image display device comprising:
   a display panel;
   a three-dimensional conversion member located on a display surface of the display panel, and
   an adhesive edge closure member,
   wherein the three-dimensional conversion member comprises:
      a base unit; and
      a lens unit located on an upper surface of the base unit, and
   wherein the base unit comprises a first base layer, a first soft layer, a second base layer, a second soft layer, and a third base layer, and
   wherein the adhesive edge closure member covers all edges of the base unit and is a black material that prevents light leakage.

2. The stereoscopic image display device according to claim 1, wherein the base unit comprises:
   the first base layer having a first thickness,
   wherein the soft layer is located on the first base layer and has a second thickness; and
   the second base layer located on the soft layer and having a third thickness, and
   wherein a sum of the first thickness, the second thickness, and the third thickness is constant.

3. The stereoscopic image display device according to claim 2, wherein the first thickness and the third thickness are equal to each other.

4. The stereoscopic image display device according to claim 1, wherein the display panel is formed such that at least a portion of the display panel is curved.

5. The stereoscopic image display device according to claim 1, wherein the lens unit comprises a lenticular lens.

6. A three-dimensional conversion member comprising:
   a base unit;
   a lens unit located on an upper surface of the base unit, and
   an adhesive edge closure member,
   wherein the base unit comprises a first base layer, a first soft layer, a second base layer, a second soft layer, and a third base layer, and
   wherein the adhesive edge closure member covers all edges of the base unit and is black material that prevents light leakage.

7. The three-dimensional conversion member according to claim 6, wherein the base unit comprises:
   the first base layer having a first thickness,
   wherein the soft layer is located on the first base layer and has a second thickness; and
   the second base layer located on the soft layer and having a third thickness, and
   wherein a sum of the first thickness, the second thickness, and the third thickness is constant.

8. The three-dimensional conversion member according to claim 7, wherein the first thickness and the third thickness are equal to each other.

* * * * *